US012637037B2

(12) United States Patent
    Hong

(10) Patent No.:    US 12,637,037 B2
(45) Date of Patent:        May 26, 2026

(54) BRAKE PEDAL MOVEMENT DEVICE

(71) Applicant: HL MANDO CORPORATION,
               Gyeonggi-do (KR)

(72) Inventor: Kwangseok Hong, Gyeonggi-do (KR)

(73) Assignee: HL MANDO CORPORATION,
               Gyeonggi-do (KR)

( * ) Notice:     Subject to any disclaimer, the term of this
                  patent is extended or adjusted under 35
                  U.S.C. 154(b) by 0 days.

(21) Appl. No.:   18/867,422

(22) PCT Filed:   May 19, 2023

(86) PCT No.:     PCT/KR2023/006816
     § 371 (c)(1),
     (2) Date:    Nov. 19, 2024

(87) PCT Pub. No.: WO2023/224419
     PCT Pub. Date: Nov. 23, 2023

(65)              Prior Publication Data
     US 2025/0368168 A1      Dec. 4, 2025

(30)         Foreign Application Priority Data

May 20, 2022    (KR) ........................ 10-2022-0061794

(51) Int. Cl.
     B60T 7/06          (2006.01)
     B60T 8/40          (2006.01)
(52) U.S. Cl.
     CPC ................ B60T 7/06 (2013.01); B60T 8/409
                                                   (2013.01)
(58) Field of Classification Search
     None
     See application file for complete search history.

(56)                 References Cited

U.S. PATENT DOCUMENTS 6,105,737  A  *   8/2000  Weigert ................ B60T 8/3275
                                                          303/3
     2019/0100188  A1*  4/2019  Lee ........................ B60T 11/102
     2021/0039612  A1*  2/2021  Marquez Sanchez .. B60T 8/326

FOREIGN PATENT DOCUMENTS

EP         2 520 473        11/2012
     JP         2003-47264        2/2003
                      (Continued)

OTHER PUBLICATIONS

International Search Report for PCT/KR2023/006816 mailed on
Aug. 28, 2023 and its English translation from WIPO (now pub-
lished as WO/2023/224419).
                      (Continued)

*Primary Examiner* — Vicky A Johnson
(74) *Attorney, Agent, or Firm* — WOMBLE BOND
DICKINSON (US) LLP

(57)                 ABSTRACT

A brake pedal moving device includes a pedal simulator
connected to a brake pedal and configured to provide a
reaction force, a motor configured to provide the power, a
power conversion portion configured to convert a rotational
force of the motor into translational movement to move the
brake pedal and the pedal simulator forward and backward,
and a housing in which at least a portion of the pedal
simulator and the power conversion portion are accommo-
dated and in which the motor is installed, wherein the
housing includes a main body including an installation space
in which the at least a portion of the pedal simulator and the
power conversion portion are accommodated, and a sub
body in which the motor and a connector electrically con-
necting the motor to the power supply or an electronic
control unit are installed to be spaced from each other.

17 Claims, 9 Drawing Sheets

(56)        References Cited

FOREIGN PATENT DOCUMENTS

| | | |
|---|---|---|
| JP | 2012-121557 | 6/2012 |
| JP | 5729577 | 6/2015 |
| KR | 10-2019-0030322 | 3/2019 |
| KR | 10-2021-0108017 | 9/2021 |
| KR | 10-2021-0108019 | 9/2021 |
| KR | 10-2021-0108021 | 9/2021 |

OTHER PUBLICATIONS

Written Opinion of the International Searching Authority for PCT/
KR2023/006816 mailed on Aug. 28, 2023 and its English transla-
tion by Google Translate (now published as WO/2023/224419).
Office Action dated Nov. 18, 2023 for Korean Patent Application
No. 10-2022-0061794 and its English translation from Global
Dossier.
Office Action dated Jul. 25, 2024 for Korean Patent Application No.
10-2022-0061794 and its English translation from Global Dossier.

* cited by examiner

BRAKE PEDAL MOVEMENT DEVICE

TECHNICAL FIELD

The disclosure relates to a brake pedal moving device, and more particularly, to a brake pedal moving device capable of moving a brake pedal forward and backward depending on an operating mode of a vehicle.

BACKGROUND ART

Brake systems for brake are essential to vehicles, and various types of brake systems are proposed for the safety of drivers and passengers.

Existing brake systems have generally used a method of supplying, when a driver steps on the brake pedal, hydraulic pressure for brake to the wheel cylinder through a booster mechanically connected to the brake pedal. Also, lately, in order to implement various braking functions by actively responding to an operating environment of the vehicle, an electric brake system that receives, when a driver steps on the brake pedal, the driver's intention to brake as an electrical signal from a pedal displacement sensor for detecting a displacement of the brake pedal and operates a hydraulic pressure supply device based on the electrical signal to supply hydraulic pressure required for brake to the wheel cylinder is being developed.

In such a brake system, because the braking of the vehicle is directly or indirectly controlled depending on brake pedal pressure from the driver, the brake pedal needs to remain exposed toward the driver in the passenger space of the vehicle to enable the driver to operate the brake pedal at any time.

Meanwhile, recently, autonomous driving systems are being developed that recognize surrounding information from cameras, radars, or sensors mounted on the vehicles, and autonomously operate and stop the vehicles based on the surrounding information without drivers' interventions. During autonomous driving of a vehicle, the vehicle is automatically braked based on detected information regardless of whether the driver operates the brake pedal. In this case, the brake pedal remained exposed to the passenger space of the vehicle deteriorates the driver's riding comfort, and in the event of a contact accident, the driver may be injured by the exposed brake pedal.

DISCLOSURE

Technical Problem

An embodiment provides a brake pedal moving device capable of adaptively adjusting a position of a brake pedal depending on an operating mode of a vehicle.

An embodiment provides a brake pedal moving device with a simple structure capable of improving efficiency of manufacturing and installation processes.

An embodiment provides a brake pedal moving device capable of improving a driver's riding comfort by easily storing a brake pedal during autonomous driving of a vehicle.

An embodiment provides a brake pedal moving device capable of providing operability of a vehicle by exposing a brake pedal toward a driver during normal driving of the vehicle.

An embodiment provides a brake pedal moving device capable of preventing a driver's injury in an event of a vehicle accident.

Technical Solution

According to one aspect of the present disclosure, a brake pedal moving device may include: a pedal simulator connected to a brake pedal and configured to provide a reaction force in response to a pedal force of the brake pedal; a motor configured to receive power from a power supply and provide the power; a power conversion portion provided between the pedal simulator and the motor and configured to convert a rotational force of the motor into translational movement to move the brake pedal and the pedal simulator forward and backward; and a housing in which at least a portion of the pedal simulator and the power conversion portion are accommodated and in which the motor is installed, wherein the housing includes a main body including an installation space in which the at least a portion of the pedal simulator and the power conversion portion are accommodated, and a sub body in which the motor and a connector electrically connecting the motor to the power supply or an electronic control unit are installed to be spaced from each other.

The sub body may include a pin hole which penetrates the sub body and which at least one connector pin electrically connecting the motor and the connector passes through and is accommodated in.

The motor may be installed and supported on one surface of the sub body, and the connector may be installed and supported on another surface of the sub body.

The pin hole may penetrate the sub body between the one surface of the sub body and the other surface of the sub body.

The one surface of the sub body may be provided as an outer surface toward the outside, and the other surface of the sub body may be opposite to the outer surface and provided as an inner surface toward the pedal simulator or the power conversion portion.

The one surface of the sub body may further include a recess into which a driving shaft of the motor is inserted.

The pedal simulator may include a reaction piston connected to the brake pedal, and a simulator body forming a bore in which the reaction piston is accommodated to move back and forth, at one side, wherein a first thread may be formed on an outer circumferential surface of the simulator body along a longitudinal direction.

The pedal simulator may further include an elastic member provided between the reaction piston and the simulator body.

The brake pedal moving device may further include a rotation preventing portion configured to prevent a rotation of the pedal simulator.

The rotation preventing portion may include at least one rotation preventing protrusion protruding from the outer circumferential surface of the simulator body, and a rotation preventing groove which is formed by being recessed in the installation space of the main body and into which the rotation preventing protrusion is insertable.

The rotation preventing groove may extend along a translational direction.

The power conversion portion may include a first gear coupled with a driving shaft of the motor, and a second gear engaged with the first gear and configured to transfer a rotational force to the simulator body.

The first gear may be provided as a worm gear with a first worm thread formed on the outer circumferential surface, and the second gear may be provided as a worm wheel with a second worm thread formed on the outer circumferential surface and engaged with the first worm thread and a second thread formed on the inner circumferential surface and engaged with the first thread.

The power conversion portion may further include a preload spring provided between the pedal simulator and the housing.

The brake pedal moving device may further include a mounting plate configured to install the housing on the vehicle.

The main body and the sub body of the housing may be provided as one piece.

The power conversion portion may further include a bearing interposed between the second gear and the main body.

One end of the elastic member may be in contact with the reaction piston, and another end of the elastic member may be in contact with an inner end of the bore.

Advantageous Effects

A brake pedal moving device according to an embodiment may adaptively adjust a position of a brake pedal depending on an operating mode of a vehicle.

A brake pedal moving device according to an embodiment may achieve efficiency of manufacturing and installation processes through a simple structure.

A brake pedal moving device according to an embodiment may improve a driver's riding comfort by easily storing a brake pedal during autonomous driving of a vehicle.

A brake pedal moving device according to an embodiment may provide operability of a vehicle by exposing a brake pedal toward a driver during normal driving of the vehicle.

A brake pedal moving device according to an embodiment may prevent a driver's injury in an event of a vehicle accident.

MODES OF THE INVENTION

Figure 1:
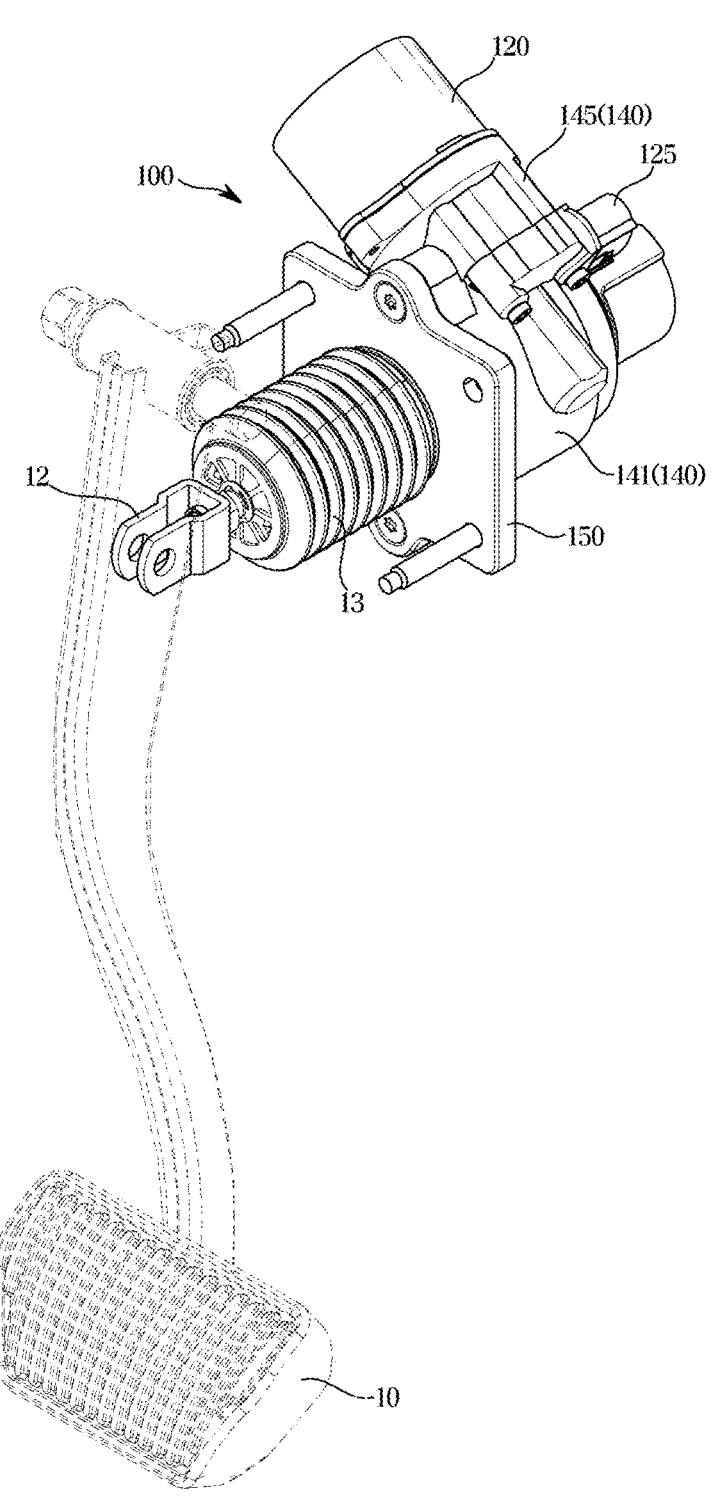
FIG. 1 is a perspective view showing a brake pedal moving device according to an embodiment.

Hereinafter, embodiments of the disclosure will be described in detail with reference to the accompanying drawings. The following embodiments are provided to sufficiently transfer the technical concepts of the disclosure to one of ordinary skill in the technical art to which the disclosure belongs. However, the disclosure is not limited to these embodiments, and may be embodied in another form. In the drawings, parts that are irrelevant to the descriptions may be not shown in order to clarify the disclosure, and also, for easy understanding, the sizes of components are more or less exaggeratedly shown.

Figure 2:
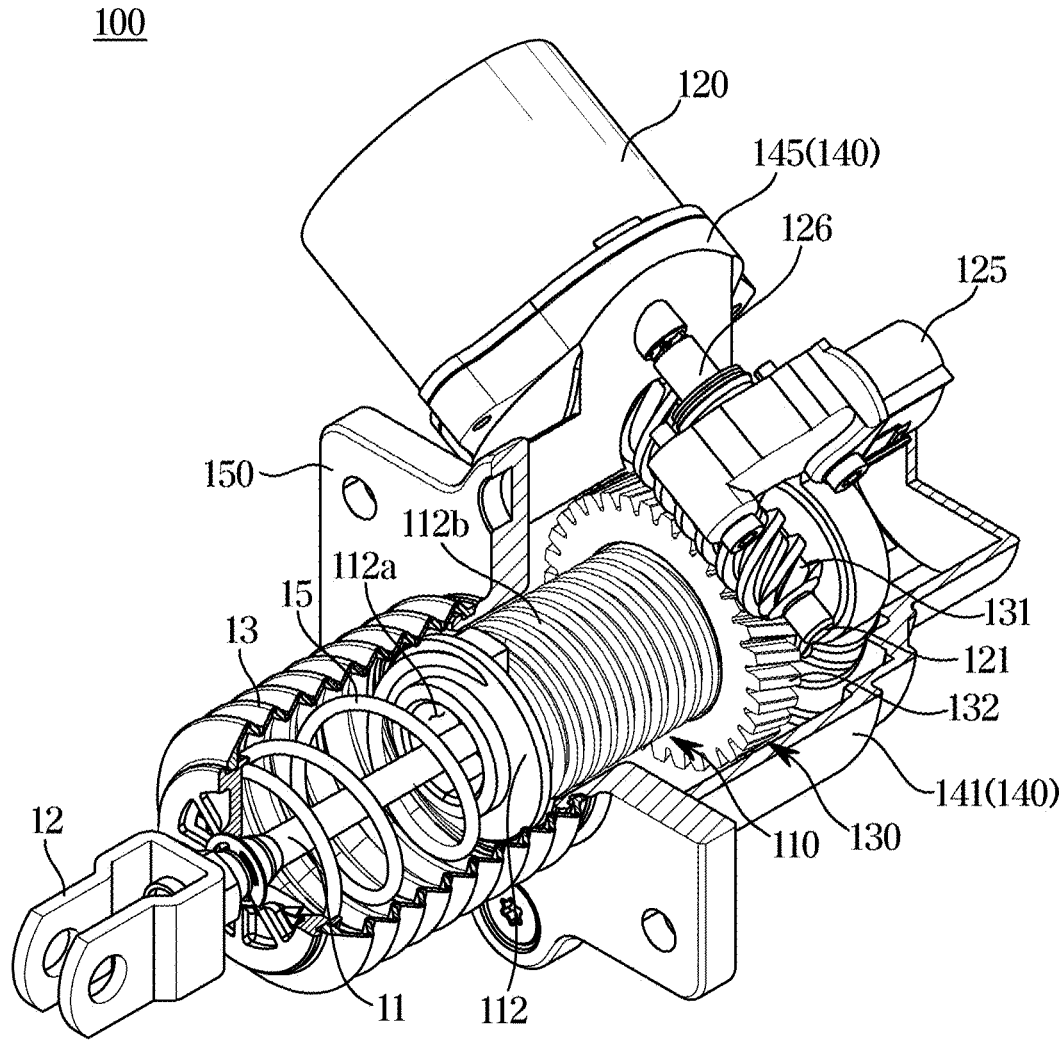
FIG. 2 is a partially cut-away perspective view of a brake pedal moving device according to an embodiment.
Figure 3:
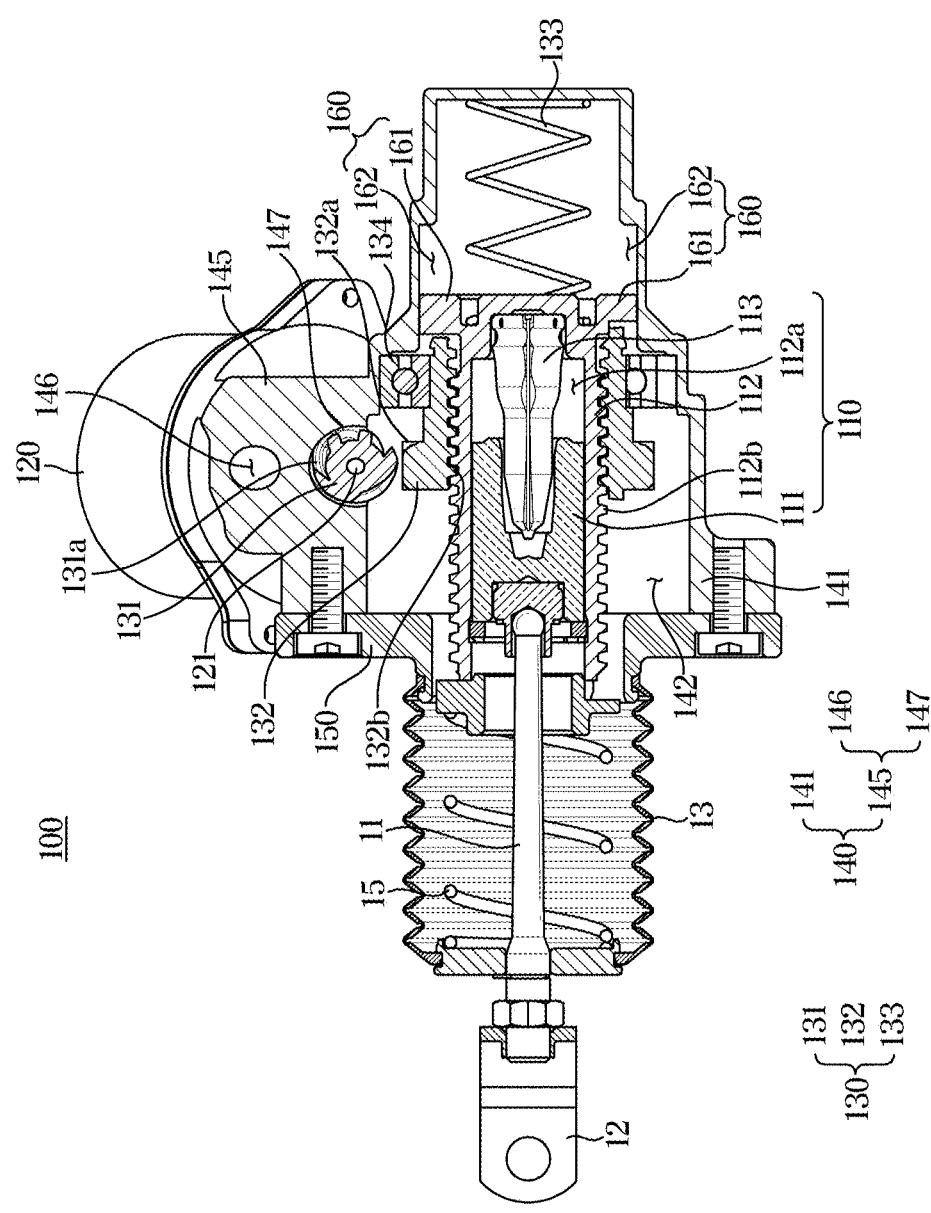
FIG. 3 is a side cross-sectional view showing a brake pedal moving device according to an embodiment.

FIG. 1 is a perspective view showing a brake pedal moving device 100 according to an embodiment, FIG. 2 is a partially cut-away perspective view of the brake pedal moving device 100 according to an embodiment, and also, FIG. 3 is a side cross-sectional view showing the brake pedal moving device 100 according to an embodiment.

The brake pedal moving device 100 according to an embodiment may move a brake pedal 10 depending on an operating mode of a vehicle to improve a driver's riding comfort and operability of the vehicle. More specifically, during autonomous driving of the vehicle, the driver may need not to operate the brake pedal 10 because braking of the vehicle is implemented automatically. Accordingly, the brake pedal moving device 100 according to an embodiment may move the brake pedal 10 forward (right direction in FIG. 3) and store the brake pedal 10 from a passenger space of the vehicle in order to provide the driver with a riding comfort. In contrast, while the vehicle is driven and braked by the driver, the brake pedal moving device 100 may move the brake pedal 10 backward (left direction in FIG. 3) to expose the brake pedal 10 to the passenger space of the vehicle in order to enable the driver to easily operate the brake pedal 10. In addition, because a position at which the brake pedal 10 is easily operated may vary depending on the driver's body size and the driver may require riding comfort even when the vehicle stops, the brake pedal moving device 100 according to an embodiment may adjust the brake pedal 10 to an appropriate position.

Referring to FIGS. 1 to 3, the brake pedal moving device 10 according to an embodiment may include a pedal simulator 110 that is connected to the brake pedal 10 and provides a reaction force to the driver in response to a pedal force of the brake pedal 10, a motor 120 that provides power for forward and backward movement of the brake pedal 10 and the pedal simulator 110, a power conversion portion 130 which is provided between the pedal simulator 110 and the motor 120 and converts a rotational force of the motor 120 into translational movement, a housing 140 in which at least a portion of the pedal simulator 110 and the power conversion portion 130 are accommodated, a rotation preventing portion 160 that prevents a rotation of the pedal simulator 110 for smooth forward and backward movement of the brake pedal 10 and the pedal simulator 110, and a mounting plate 150 that installs the housing 140 in the vehicle.

The brake pedal 10 may be positioned in a front and lower side from a driver seat inside the passenger space of the vehicle. The brake pedal 10 may be connected to a reaction piston 111 of the pedal simulator 110 which will be described later, by an input rod 11, and may be rotatably supported through a clevis. In the vehicle, the passenger space may be partitioned from an engine room by a dash panel (not shown), and in this case, the input rod 11 may penetrate the dash panel. A pedal spring 15 for returning the brake pedal 10 to its original position after a pedal force of the brake pedal 10 is applied may be provided around the input rod 11. A front end (right end in FIG. 3) of the pedal spring 15 may be supported by a stopper, and a rear end (left end in FIG. 3) of the pedal spring 15 may be supported by a retainer. Also, a boot 13 may be provided around the pedal spring 15 to prevent an inflow of foreign substances.

The pedal simulator 110 may provide a reaction force in response to a pedal force of the brake pedal 10 to provide the driver with pedal feeling.

Referring to FIGS. 2 and 3, the pedal simulator 110 may include a reaction piston 111 connected to the brake pedal 10, and a bore 112a in which the reaction piston 111 moves back and forth, and include a simulator body 112 with a first thread 112b formed on the outer circumferential surface, and an elastic member 113 that elastically supports the reaction piston 111.

The reaction piston 111 may be connected to the input rod 11 at the rear end (left end in FIG. 3) and may be displaced according to a pedal force of the brake pedal 10. More specifically, when the driver applies a pedal force to the brake pedal 10, the reaction piston 111 may move forward (right direction in FIG. 3) together with the input rod 11, and in contrast, when the driver releases a pedal force applied to the brake pedal 10, the reaction piston 111 may move backward (left direction in FIG. 3) together with the input rod 11. While the reaction piston 111 moves forward, the reaction piston 111 may press and compress the elastic member 113 which will be described below, and an elastic restoring force may be provided as pedal feeling to the driver.

Meanwhile, although not shown in the drawings, the reaction piston 111 may be provided with a magnetic material (not shown), and the housing 140 which will be described below may be provided with a displacement sensor (not shown) to detect a displacement of the brake pedal 10. According to an operation of the brake pedal 10, a displacement may occur in the reaction piston 11 and the magnetic material, and the displacement sensor may measure a change in magnetic force or magnetic field caused by the displacement, thereby detecting a displacement of the brake pedal 10. The displacement sensor may transmit information about the detected displacement to an electronic control unit (not shown).

The simulator body 112 may be formed in a hollow cylindrical shape with a closed front end (right end in FIG. 3). In a rear portion of the simulator body 112, the bore 112a into which the reaction piston 111 is inserted to move back and forth may be formed in a longitudinal or translational direction (left-right direction in FIG. 3), and on the outer circumferential surface of the simulator body 112, the first thread 112b that is engaged with a second gear 132 of the power conversion portion 130 which will be described below may be formed in the longitudinal or translational direction. As the first thread 112b is engaged with the second gear 132 of the power conversion portion 130 which will be described below, a rotational force of the second gear 132 may be converted into translational movement of the simulator body 112.

Also, the stopper may be connected and supported to the rear portion of the simulator body 112, and a preload spring 133 of the power conversion portion 130 which will be described below may be provided on a front portion of the simulator body 112 to elastically support the simulator body 112. In addition, a rotation preventing protrusion 161 of the rotation preventing portion 160 which will be described below may protrude from an outer surface of the front portion of the simulator body 112, which will be described with reference to FIG. 7, below.

The elastic member 113 may be provided between the reaction piston 111 and the simulator body 112 to elastically support the reaction piston 111. More specifically, the elastic member 113 may be positioned in an innermost space of the bore 112a of the simulator body 112, and accordingly, a front end of the elastic member 113 may be in contact with and supported on an inner end of the bore 112a while a rear end of the elastic member 113 may be in contact with and supported on a front surface (right surface in FIG. 3) of the reaction piston 111. The elastic member 113 may be made of various materials that are elastically deformable and generate an elastic restoring force when being compressed. In FIG. 3, the elastic member 113 is shown as being made of rubber. However, this is only an example for helping understanding of the disclosure, and the elastic member 113 may be made of various members that are elastically deformed and restored, such as a coil spring.

In regard to an operation of the pedal simulator 110, when the driver applies a pedal force to the brake pedal 10 to brake the vehicle, the reaction piston 111 connected to the input rod 11 may move forward. While the reaction piston 111 moves forward, the reaction piston 111 may compress the elastic member 113, and an elastic restoring force of the elastic member 113 compressed may be provided as pedal feeling to the driver. Thereafter, when the driver releases the pedal force applied to the brake pedal 10 to release the brake of the vehicle, the reaction piston 111 may return to its original position by the pedal spring 15, and the elastic member 113 may also return to its original shape and its original position by the restoring force.

The motor 120 may generate and provide power by receiving power from a power supply such as a battery of the vehicle.

Figure 4:
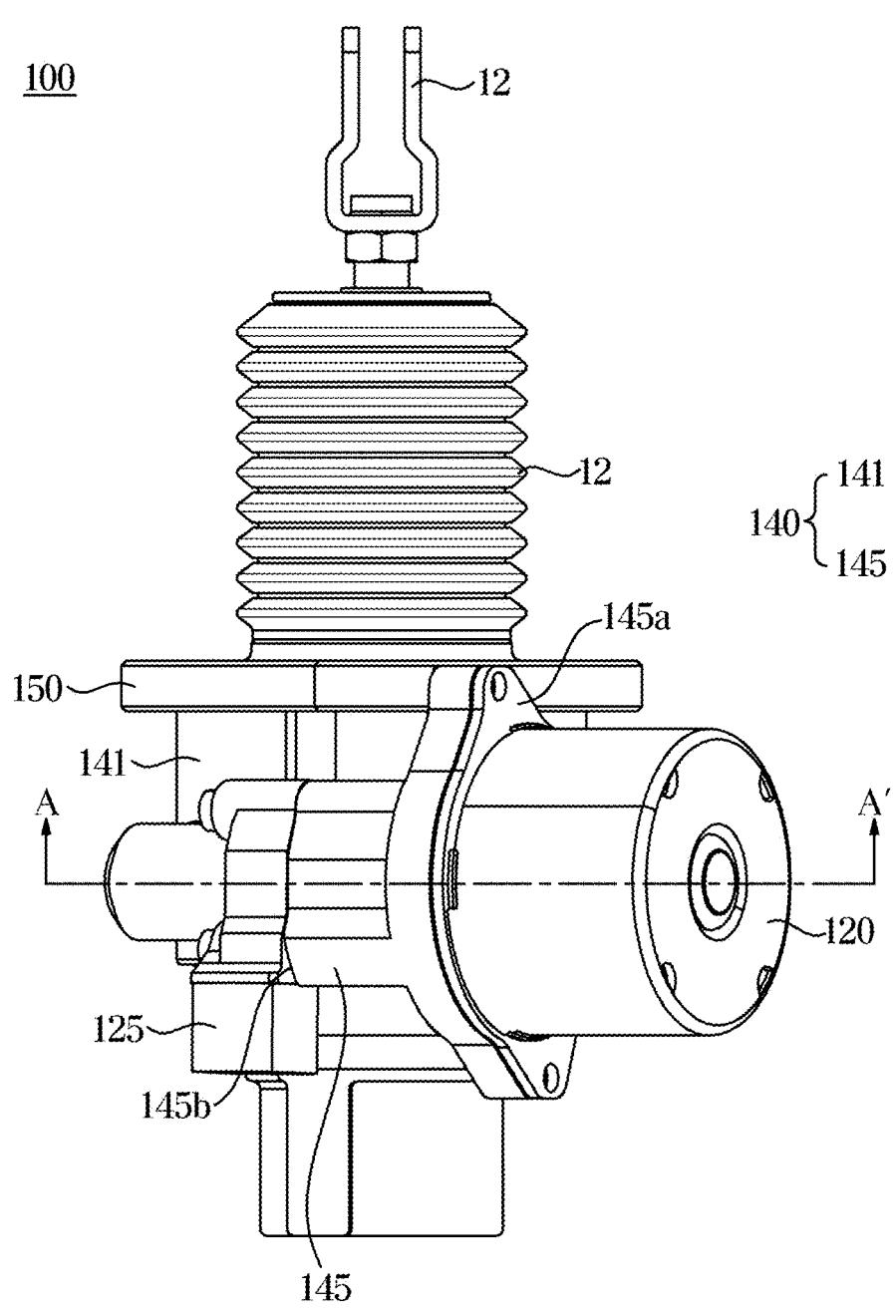
FIG. 4 is a top view showing a brake pedal moving device according to an embodiment.
Figure 5:
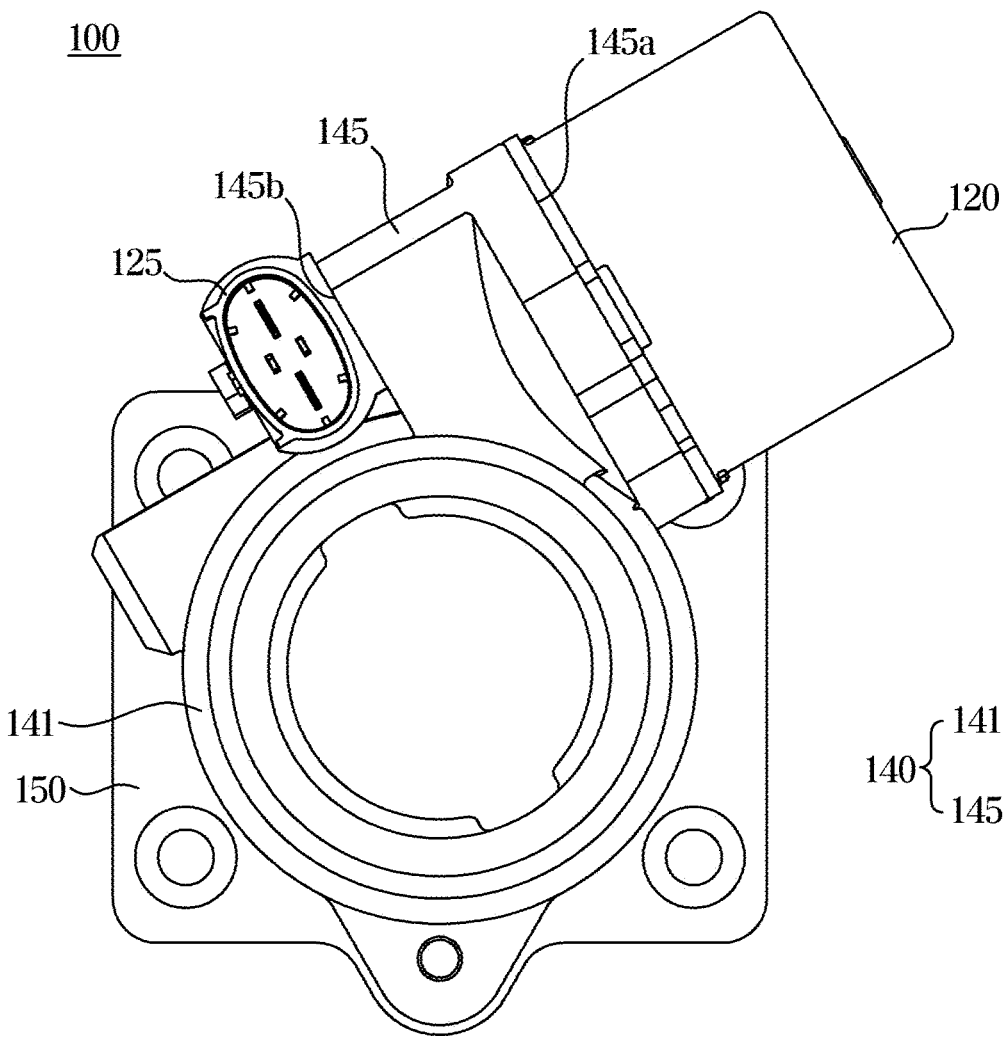
FIG. 5 is a side view of a brake pedal moving device according to an embodiment, shown in a front direction.
Figure 6:
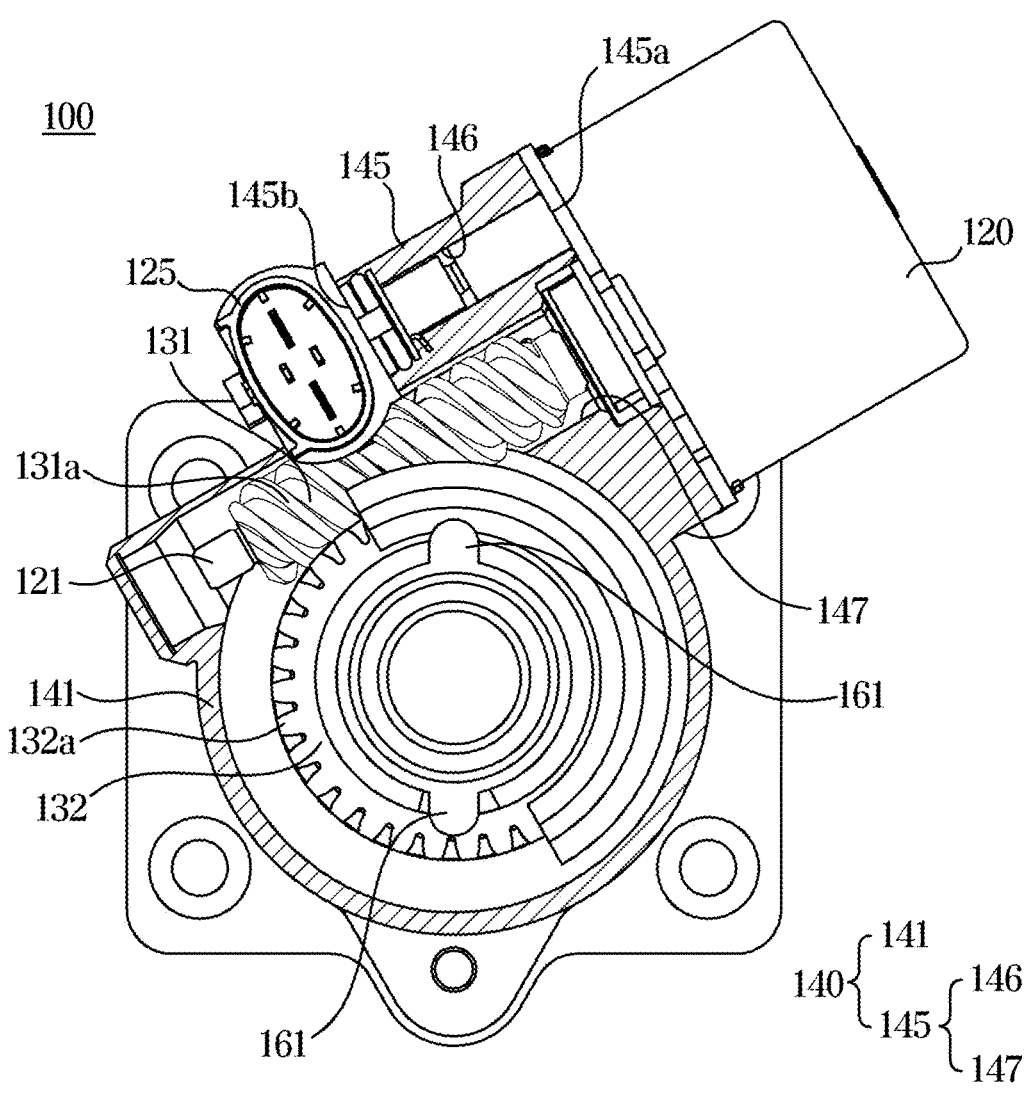
FIG. 6 is a cross-sectional view taken along line A-A' of FIG. 4.

FIG. 4 is a top view showing the brake pedal moving device 100 according to an embodiment, and FIG. 5 is a side view of the brake pedal moving device 100 according to an embodiment, shown in a front direction. Also, FIG. 6 is a cross-sectional view taken along line A-A' of FIG. 4.

Referring to FIGS. 1 to 6, the motor 120 may be installed and supported on a sub body 145 of the housing 140 which will be described below, and generate and provide a rotational force for forward and backward movement of the brake pedal 10. The motor 120 may be provided as a bidirectional motor to implement forward and backward movement of the brake pedal 10. The motor 120 may be connected to the power supply by a connector 125 to receive power, or may be electrically connected to the electronic control unit to receive an operation signal. The motor 120 and the connector 125 may be installed and supported on the sub body 145 of the housing 140 which will be described below, wherein the motor 120 may be installed on one surface of the sub body 145, and the connector 125 may be installed on another surface 145b that is opposite to the one surface 145a. A driving shaft 121 of the motor 120 may be inserted into and positioned in a recess 147 provided in the sub body 145 which will be described below, and a connector pin 126 connecting the motor 120 and the connector 125 may pass through a pin hole 146 provided in the sub body 145 which will be described below. This will be described in detail, below.

Meanwhile, an operation of the motor 120 may be controlled automatically based on an electrical signal transmitted from the electronic control unit, or may be controlled according to an operating signal transmitted from the driver.

The power conversion portion 130 may receive a rotational force of the motor 220 and convert the rotational force into translational movement to move the brake pedal 19 and the pedal simulator 110 forward or backward.

Figure 7:
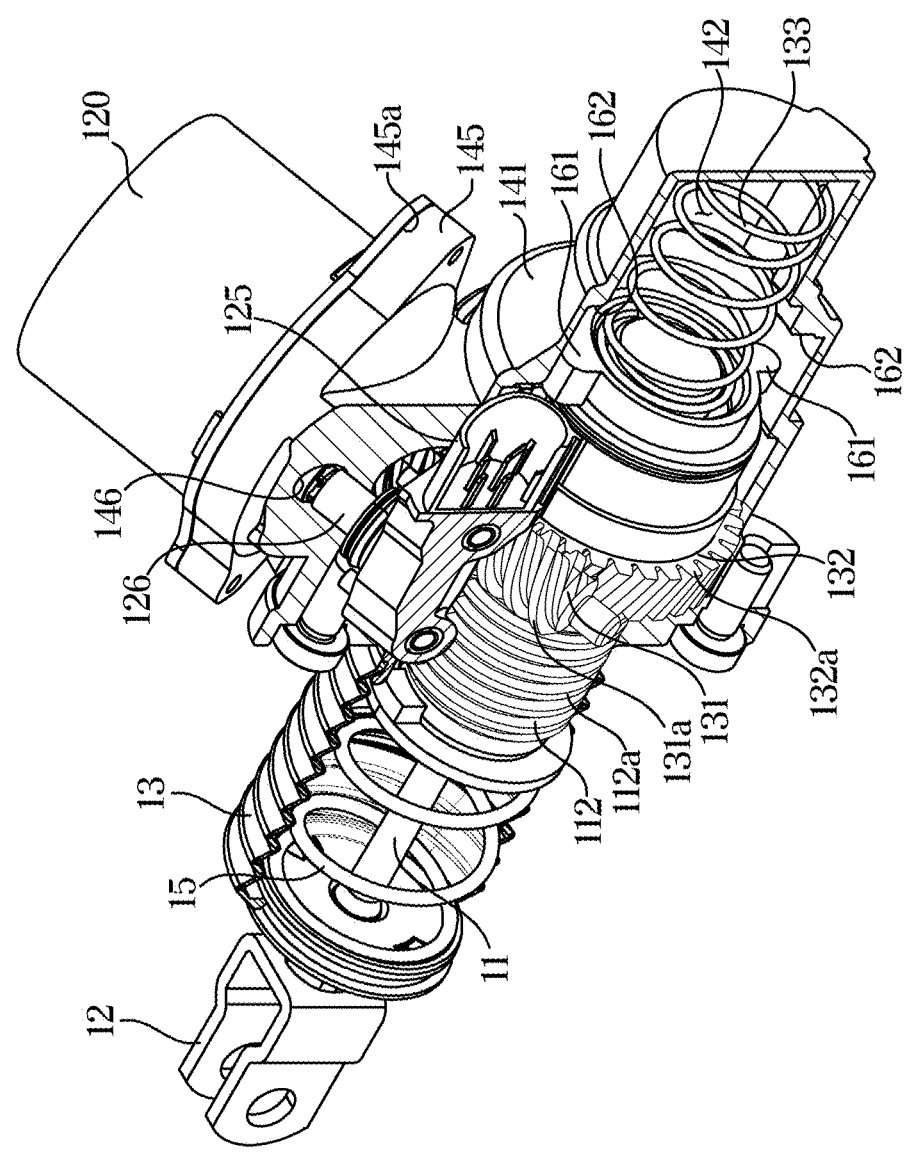
FIG. 7 is a partially cut-away perspective view of a brake pedal moving device according to an embodiment, shown in another direction.

FIG. 7 is a partially cut-away perspective view of the brake pedal moving device 100 according to an embodiment, shown in another direction. Referring to FIGS. 1 to 7, the power conversion portion 130 may include a first gear 131 coupled with the driving shaft 121 of the motor 121, a second gear 132 engaged with the first gear 131 and transferring a rotational force to the first thread 112b formed on the outer circumferential surface of the simulator body 112, the preload spring 133 interposed between the pedal simulator 110 and the housing 140 which will be described below and assisting smooth backward movement of the pedal simulator 110, and a bearing 134 interposed between the second gear 132 and the housing 140 which will be described below.

The first gear 131 may be coupled to the driving shaft 121 of the motor 120 to rotate together with the driving shaft 121, and transfer a rotational force provided from the motor 120 to the second gear 132. The first gear 131 may be provided as a worm gear 131 with a first worm thread 131a formed along the longitudinal direction on the outer circumferential surface. The first gear 131 may be provided separately from the driving shaft 121 of the motor 120 and coupled to the driving shaft 121, or may be provided by processing the first worm thread 131a on the driving shaft 121 of the motor 120.

The second gear 132 may receive a rotational force transferred from the first gear 131 and transfer power to the simulator body 112 of the pedal simulator 110. The second gear 132 may be provided in a ring shape on an outer side of the simulator body 112, and may be arranged coaxially with the simulator body 112. The second gear 132 may be provided as a worm wheel 132 having an outer circumferential surface in which a second warn thread 132a engaged with the first worm thread 131a is formed and an inner circumferential surface in which a second thread 132b engaged with the first thread 112b of the simulator body 112 is formed.

The bearing 134 may be provided between the housing 140 and the second gear 132. More specifically, the bearing 134 may be interposed between an inner surface of an installation space 142 of a main body 141 which will be described below and an outer surface of the second gear 132, and through the bearing 134, the second gear 132 may rotate smoothly on the main body 141, and at the same time, wear and noise between component elements due to rotation of the second gear 132 may be reduced.

Forward and backward movement of the brake pedal 10 and the pedal simulator 110 by the power conversion portion 130 will be described with reference to FIGS. 8 and 9, below.

Meanwhile, in order to quickly expose the brake pedal 10 to the passenger space by smoothly moving the brake pedal 10 and the pedal simulator 110 backward, while reducing a load of the motor 120, the pedal simulator 110 may be elastically supported by the preload spring 133. One end of the preload spring 133 may be supported on a front end of the simulator body 112 of the pedal simulator 110, and another end of the preload spring 133 may be supported on an inner end of the installation space 142 of the housing 140 which will be described below. When the pedal simulator 110 moves forward to store the brake pedal 10, the preload spring 133 may be compressed to press the pedal simulator 110 and the brake pedal 10 backward. Thereafter, when the brake pedal 10 moves backward to be exposed to the passenger space, the pedal simulator 110 and the brake pedal 10 may smoothly and quickly move backward by an elastic restoring force of the preload spring 133, and the pedal simulator 110 and the brake pedal 10 may be elastically supported backward by the preload spring 133, thereby reducing a load of the motor 120. The preload spring 133 may be provided as a coil spring, as shown in the drawings, although not limited thereto in structure and shape, and the preload spring 133 may have various shapes and be made of various materials as long as the preload spring 133 is compressed when the brake pedal 10 and the pedal simulator 110 move forward to press the simulator body 112 backward.

The housing 140 may accommodate at least a portion of the pedal simulator 110 and the power conversion portion 130, and the motor 120 may be installed in the housing 140. Referring to FIGS. 1 to 7, the housing 140 may include the main body 141 having the installation space 142 in which the at least a portion of the pedal simulator 110 and the power conversion portion 130 are accommodated, and the sub body 145 on which the motor 120 and the connector 124 are installed and supported.

The main body 141 may be formed in a hollow cylindrical shape with a closed front end (right end in FIG. 3). More specifically, in the main body 141, the installation space 142 may be formed along a translational direction of the brake pedal 10 and the pedal simulator 110, and in the installation space 142, the input rod 11, at least some component elements of the pedal simulator 110, and the power conversion portion 130 may be accommodated and arranged. The main body 141 may be positioned at a relatively lower location (lower position in FIG. 5) than the sub body 145 which will be described below.

The motor 120, and the connector 125 electrically connecting the motor 120 to the power supply or the electronic control unit may be installed and supported on the sub body 145. The motor 120 may be installed and supported on one surface (right surface in FIG. 3) 145a of the sub body 145, and the connector 125 may be installed and supported on another surface 145b (left surface in FIG. 3) which is opposite to the one surface 145a. More specifically, the one surface 145a of the sub body 145, on which the motor 120 is installed, may form an outer surface toward outside, and the other surface 145b on which the connector 125 is installed may form an opposite surface of the outer surface, in other words, an inner surface toward a center of the brake pedal moving device 100, on which component elements, such as the pedal simulator 110 or the power conversion portion 130, are provided.

As such, by installing and supporting the connector 125 electrically connecting the motor 120 on the other surface 145b of the sub body 145 corresponding to an inner area of the housing 140, instead of an outer area or surrounding area of the brake pedal moving device 100, a size of the brake pedal moving device 100 may be reduced to improve installation and compatibility of the vehicle, and furthermore, a cover (outer surface of the motor 120) of the motor 120 may be simplified to improve efficiency of manufacturing and assembling. The motor 120 and the connector 125 may be firmly installed on the one surface 145a and the other surface 145b of the sub body 145, respectively, by a coupling member such as a bolt.

Because the motor 120 and the connector 125 are respectively installed and supported on the one surface 145a and the other surface 145b of the sub body 145 of the housing 140, the connector pin 126 electrically connecting the motor 120 and the connector 125 may penetrate the sub body 145. To this end, the pin hole 146 may penetrate the sub body 145 in a width direction (left-right direction in FIG. 5) between the one surface 145a and the other surface 145b. The connector pin 126 may penetrate the pin hole 146 such that one end of the connector pin 126 is connected to the motor 120 and another end of the connector pin 126 is connected to the connector 125, thereby electrically connecting the motor 120 and the connector 125 installed on different surfaces of the sub body 145.

Meanwhile, the main body 141 and the sub body 145 of the housing 140 may be manufactured as one piece for high rigidity, and as described above, the one surface 145*a* of the sub body 145 may be provided with a recess 147 through which the driving shaft 121 of the motor 120 and the first gear 131 are inserted into inside of the housing 140. Also, the housing 140 may be firmly installed on a support that is fixable on the vehicle, for example, the dash panel, etc., by the mounting plate 150. The mounting plate 150 may be coupled and fastened to the dash panel through a plurality of bolts, etc.

The rotation preventing portion 160 may prevent a rotation of the pedal simulator 110 such that a rotational force provided from the motor 120 is converted into translational movement of the pedal simulator 110.

Referring to FIG. 7, the rotation preventing portion 160 may include at least one rotation preventing protrusion 161 protruding from the simulator body 112, and a rotation preventing groove 162 recessed in the installation space 142 of the main body 141, wherein the rotation preventing protrusion 161 is insertable into the rotation preventing groove 162.

The rotation preventing protrusion 161 may protrude outward from the outer circumferential surface of the simulator body 112 along a radial direction. In FIG. 7, a pair of rotation preventing protrusions 161 are shown as being provided on upper and lower ends of the simulator body 112. However, the position and number of the rotation preventing protrusion 161 may change variously. The rotation preventing groove 162 may be formed by being recessed at a position that is opposite to the rotation preventing protrusion 161 on the inner surface of the installation space 142 of the main body 141. The rotation preventing groove 162 may extend in the longitudinal or translational direction on the inner surface of the installation space 142 such that the rotation preventing protrusion 161 slides on and moves along the rotation preventing groove 162.

Hereinafter, an operation of the brake pedal moving device 100 according to an embodiment will be described.

Figure 8:
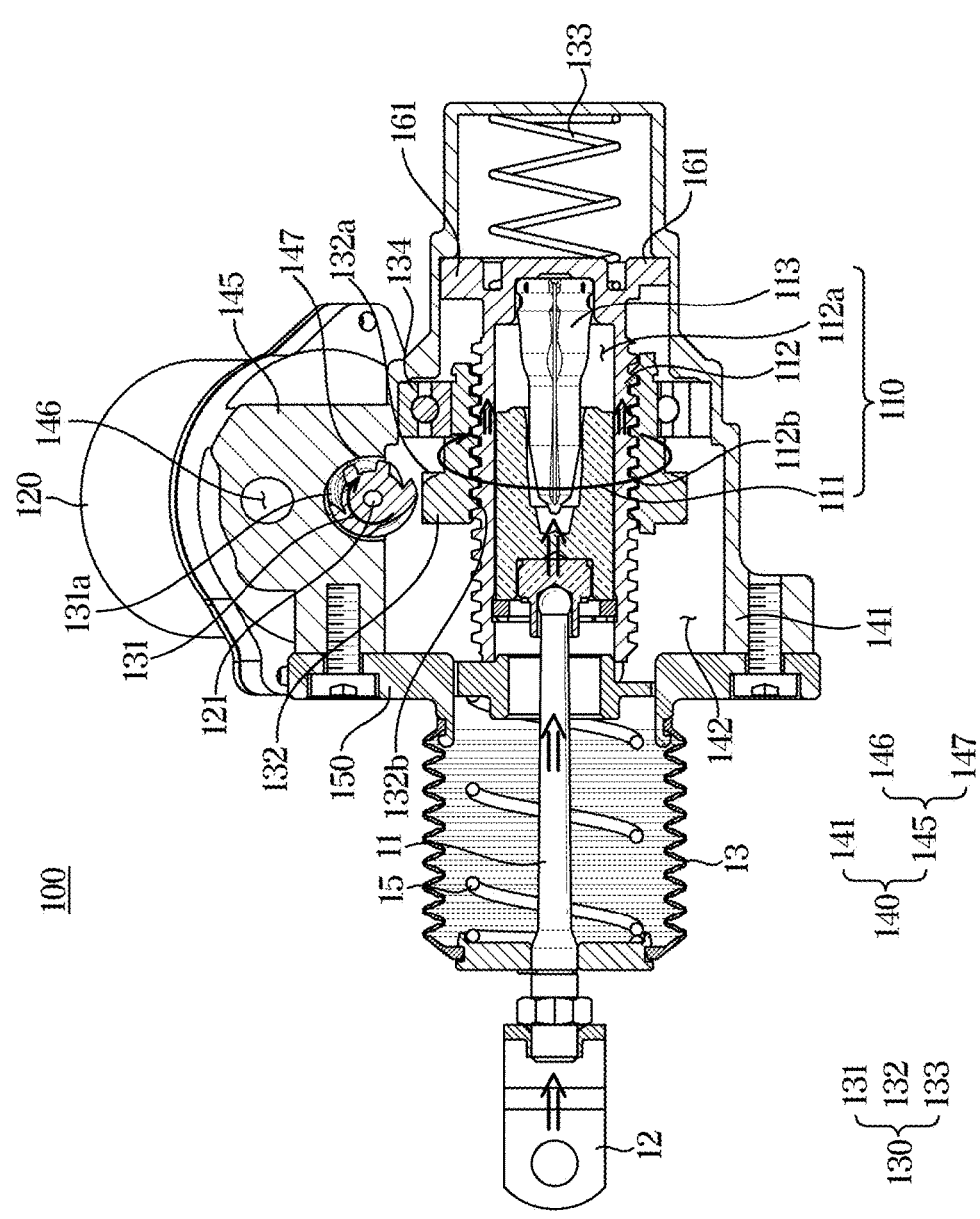
FIG. 8 is a side cross-sectional view showing a brake pedal moved forward and stored by a brake pedal moving device according to an embodiment.

FIG. 8 is a side cross-sectional view showing the brake pedal 10 moved forward and stored by the brake pedal moving device 100 according to an embodiment.

Referring to FIG. 8, when the brake pedal 10 needs to move forward (right direction in FIG. 8) and be stored during autonomous driving of the vehicle or in response to a request from a driver, the electronic control unit may transmit an electrical signal to operate the motor 120 and rotate the driving shaft 121 in one direction. Accordingly, the first gear 131 provided on the driving shaft 121 of the motor 120 may also rotate in one direction, and the second gear 132 engaged with the first gear 131 may also rotate in one direction by the rotation of the first gear 131. A rotational force of the second gear 132 may be transferred to the simulator body 112 engaged with the second thread 132*b* of the second gear 132. However, because a rotation of the simulator body 112 is restricted by the rotation preventing portion 160, the simulator body 112 may move forward by the rotational force transferred from the second gear 132. As the simulator body 112 moves forward, the brake pedal 10 connected to the simulator body 112 may also move forward together and thus, the brake pedal 10 may be stored from the passenger space.

Hereinafter, an operation state in which the brake pedal 10 is exposed to the passenger space and operates will be described.

Figure 9:
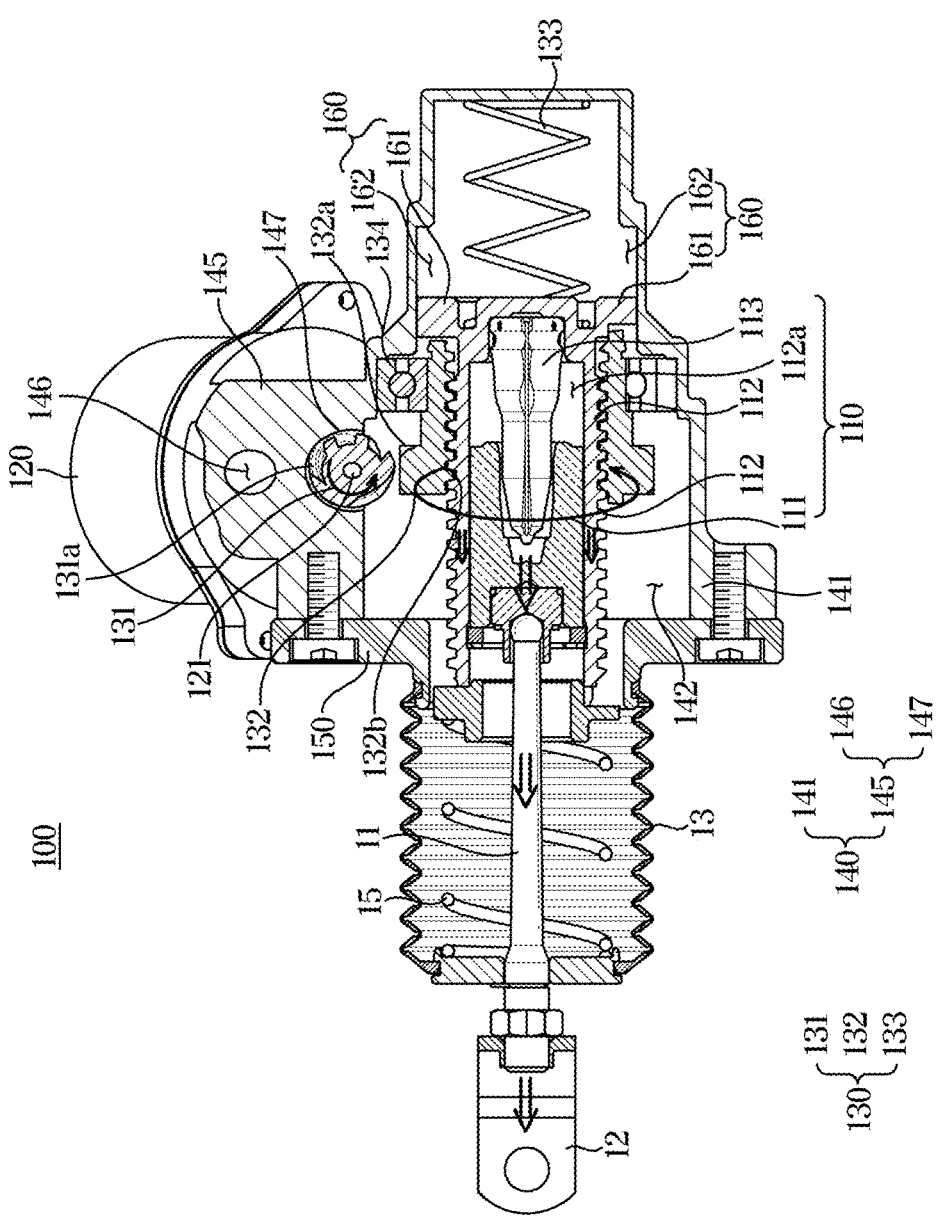
FIG. 9 is a side cross-sectional view showing a brake pedal moved backward and exposed to a passenger space by a brake pedal moving device according to an embodiment.

FIG. 9 is a side cross-sectional view showing the brake pedal 10 moved backward and exposed to the passenger space by the brake pedal moving device 100 according to an embodiment.

Referring to FIG. 9, when autonomous driving of the vehicle terminates or when a driver issues a request for performing braking on his/her own, the brake pedal 10 may move backward (left direction in FIG. 9) to be exposed to the passenger space. The electronic control unit may transmit an electrical signal to operate the motor 120 and rotate the driving shaft 121 in another direction. Accordingly, the first gear 131 provided on the driving shaft 121 of the motor 120 may also rotate in another direction, and the second gear 132 engaged with the first gear 131 may also rotate in the other direction by the rotation of the first gear 131. A rotational force of the second gear 132 may be transferred to the simulator body 112 engaged with the second thread 132*b* of the second gear 132, and because a rotation of the simulator body 112 is restricted by the rotation preventing portion 160, the simulator body 112 may move backward by the rotational force transferred from the second gear 132. As the simulator body 112 moves backward, the brake pedal 10 connected to the simulator body 112 may also move backward together, and thus, the brake pedal 10 may be exposed to the passenger space.

The invention claimed is:

1. A brake pedal moving device comprising:
a pedal simulator connected to a brake pedal and configured to provide a reaction force in response to a pedal force of the brake pedal;
a motor configured to receive power from a power supply and provide the power;
a power conversion portion provided between the pedal simulator and the motor and configured to convert a rotational force of the motor into translational movement to move the brake pedal and the pedal simulator forward and backward; and
a housing in which at least a portion of the pedal simulator and the power conversion portion are accommodated and in which the motor is installed, wherein
the housing comprises
a main body including an installation space in which the at least a portion of the pedal simulator and the power conversion portion are accommodated, and
a sub body in which the motor and a connector electrically connecting the motor to the power supply or an electronic control unit are installed to be spaced from each other,
wherein the sub body comprises a pin hole which penetrates the sub body and which at least one connector pin electrically connecting the motor and the connector passes through and is accommodated in.

2. The brake pedal moving device of claim 1, wherein the motor is installed and supported on one surface of the sub body, and the connector is installed and supported on another surface of the sub body.

3. The brake pedal moving device of claim 2, wherein the pin hole penetrates the sub body between the one surface of the sub body and the other surface of the sub body.

4. The brake pedal moving device of claim 2, wherein the one surface of the sub body is provided as an outer surface toward the outside, and
the other surface of the sub body is opposite to the outer surface and provided as an inner surface toward the pedal simulator or the power conversion portion.

5. The brake pedal moving device of claim 2, wherein the one surface of the sub body further comprises a recess into which a driving shaft of the motor is inserted.

6. The brake pedal moving device of claim 1, wherein the pedal simulator comprises a reaction piston connected to the brake pedal, and a simulator body forming a bore in which the reaction piston is accommodated to move back and forth, at one side, wherein a first thread is formed on an outer circumferential surface of the simulator body along a longitudinal direction.

7. The brake pedal moving device of claim 6, wherein the pedal simulator further comprises an elastic member provided between the reaction piston and the simulator body.

8. The brake pedal moving device of claim 7, wherein one end of the elastic member is in contact with the reaction piston, and another end of the elastic member is in contact with an inner end of the bore.

9. The brake pedal moving device of claim 6, further comprising a rotation preventing portion configured to prevent a rotation of the pedal simulator.

10. The brake pedal moving device of claim 9, wherein the rotation preventing portion comprises at least one rotation preventing protrusion protruding from the outer circumferential surface of the simulator body, and a rotation preventing groove which is formed by being recessed in the installation space of the main body and into which the rotation preventing protrusion is insertable.

11. The brake pedal moving device of claim 10, wherein the rotation preventing groove extends along a translational direction.

12. The brake pedal moving device of claim 6, wherein the power conversion portion comprises a first gear coupled with a driving shaft of the motor, and a second gear engaged with the first gear and configured to transfer a rotational force to the simulator body.

13. The brake pedal moving device of claim 12, wherein the power conversion portion further comprises a bearing interposed between the second gear and the main body.

14. The brake pedal moving device of claim 12, wherein the first gear is provided as a worm gear with a first worm thread formed on the outer circumferential surface, and the second gear is provided as a worm wheel with a second worm thread formed on the outer circumferential surface and engaged with the first worm thread and a second thread formed on the inner circumferential surface and engaged with the first thread.

15. The brake pedal moving device of claim 12, wherein the power conversion portion further comprises a preload spring provided between the pedal simulator and the housing.

16. The brake pedal moving device of claim 1, further comprising a mounting plate configured to install the housing on the vehicle.

17. The brake pedal moving device of claim 1, wherein the main body and the sub body of the housing are provided as one piece.

\* \* \* \* \*